2,838,564
Patented June 10, 1958

2,838,564

PRODUCTION OF SURFACE ACTIVE MATERIALS

Samuel L. Norwood and Thomas W. Sauls, College Park, Ga., assignors to Tennessee Corporation, New York, N. Y., a corporation of New York No Drawing. Application April 25, 1956
Serial No. 580,435

4 Claims. (Cl. 260—505)

This invention relates to the production of alkylaryl sulfonates for use as detergents and for like purposes, and more particularly to an improved process whereby these surface active agents can be produced in a simple, economical and efficient manner.

The alkylaryl sulfonates and their salts comprise a well known and widely used class of surface active agents. The aryl group may be benzene or any of its benzenoid derivatives such as toluene, xylene, etc., condensed nuclei as in the case of naphthalene and the like, and compounds such as diphenyl. The alkyl side chains may be provided by reacting the aryl group with an olefinic compound obtained in any desired way from any suitable source; for most purposes the alkyl groups range from 6 to 18 carbon atoms although these are not necessary limits. The olefins may for example be derived from fatty acids or alcohols, but more often suitable petroleum fractions are used. Propylene prepared by dehydrogenation of propane will polymerize to yield products containing three and four propylene units and accordingly called propylene trimer and tetramer, or sometimes nonene and dodecene, and such products are preferred alkylation media. The sulfonation of the aryl groups then follows in known manner with well known sulfonating media such as sulfuric acid, oleum, sulfur trioxide, chlorosulfonic acid, etc.

The alkylaryl sulfonic acids of the types discussed above and their salts form a large and well known class of surface active materials and are widely used for various purposes, especially as detergents. The sulfonic acids can be used as such but their water-soluble salts such as the sodium salt are usually preferred.

The alkylation of the aromatic compound with the olefin is a well known reaction. Many different catalysts have been used successfully to promote this reaction, the most common being anhydrous aluminum chloride, hydrogen fluoride, and sulfuric acid. The normal procedure of manufacturing the alkylaryl sulfonate is to perform the alkylation with the aid of a catalyst as just described, and then to remove the catalyst, wash the crude alkylation mixture and fractionate it by distillation. The relatively pure distilled alkylate is then sulfonated and neutralized with an alkali to yield a high grade detergent composition.

One of the drawbacks of prior practice as set forth above is the necessity for purification in order to obtain a product of satisfactory quality. In all instances known to us, attempts to produce an acceptable detergent and surface active composition by sulfonating the crude total alkylation mixture have not given the desired results and the products have had to undergo varying amounts of purification and separation to be satisfactory.

One of the main objects of our invention is to provide an improved process of alkylation-sulfonation such that no separation or purification of the reacting materials is necessary to produce detergent compositions of high quality. In other words, the invention aims to eliminate any need for isolating, purifying, or analyzing the alkylation mixture in order to produce such compositions. The acceptability of the total sulfonated product can be determined from its wetting power and detergent action, the goal being to obtain the maximum wetting power from a unit of olefin used to alkylate the aromatic compound. For this determination the known Clarkson-Draves wetting test is the major control, but detergency and foaming ability may also be measured. Further the amount of residual unsulfonated oil can be used as a criterion, since in general the wetting power increases as the oil decreases.

More specifically stated, processes embodying the invention use sulfuric acid as an alkylation catalyst, but instead of separating the sulfuric acid layer after alkylation, the total alkylation mixture is sulfonated by adding a sulfonating agent as set forth above. We prefer to use a mixture of sulfur trioxide dissolved in liquid sulfur dioxide because the cooling properties of this mixture permit rapid addition of sulfur trioxide without undue discoloration or development of odorous products. After removal of residual sulfur dioxide and hydrolysis, the acid mixture is neutralized with a base such as sodium hydroxide. If the hereinafter stated conditions of reaction of the present invention are adhered to, this method gives a product which, after drum-drying, contains approximately 50% sodium sulfate, 2% oil, and 48% sodium sulfonate. This product gives crystal clear solutions in dilute aqueous media and exhibits wetting and detergency properties equivalent at least to 75–80% of those exhibited by a refined alkylate sulfonate (on the basis of equivalent sulfonate content).

The advantages of such a process include the elimination of disposal and separation problems; a smooth, rapid sulfonation reaction; usage of minor surface active by-products of alkylation, such as olefin sulfonates and lower alkylaryl sulfonates; usage of sodium sulfate as a builder; and general economy.

We have found that the quality of the finished sulfonated product depends to a large extent on maintaining certain well defined conditions of alkylation. The particular conditions found to be important are the temperature of alkylation (0–10° C.), the strength of the sulfuric acid (95–96%), and the mode and time of addition of the reagents (olefin into a mixture of the sulfuric acid and aromatic hydrocarbon over a 1–3 hour period). Any deviation from these conditions leads to substantially inferior wetting and detergent properties of the ultimate sulfonated product.

In carrying out the foregoing procedure, it is generally desirable to use from 0.9 to 1.25 moles of aromatic hydrocarbon for each mole of olefin added. The amount of sulfuric acid used as an alkylation catalyst may vary from about one to about three moles per mole of olefin. The sulfonation mixture should contain from about 1.5 to about 2.4 moles of $SO_3$ per mole of olefin. When sulfur trioxide is dissolved in liquid sulfur dioxide to form the sulfonation mixture as suggested above, the amount of $SO_2$ is not critical and may vary within wide limits, say 3 to 10 parts by weight per part of $SO_3$. Using these conditions, the sulfonation temperature (atmospheric pressure) may vary from an initial low of about $-10°$ C. to 35° C. and the sulfonation time from about 30 minutes to 2 hours; these values are not critical.

The effects of the three important factors mentioned above on the properties of the surface active material, as determined by the amount of oil in the product and by wetting times, are shown by the following tables:

TABLE I

*Effect of varying the time of addition of dodecene in the benzene—$H_2SO_4$ mixture*

| Time (min.) | Percent Oil in Product (dry basis) | Wetting Times (seconds) in Distilled Water (on the total sodium sulfonate basis) | |
|---|---|---|---|
| | | 0.05% | 0.2% |
| 30 | 4.73 | 41.0 | 9.0 |
| 60 | 3.75 | 24.5 | 5.4 |
| 115 | 2.59 | 22.0 | 4.0 |
| 184 | 2.98 | 28.0 | 4.5 |

Alkylation temperature 0–10° C.
95% $H_2SO_4$.
1 mole dodecene: 1 mole benzene: 2 moles $H_2SO_4$: 2 moles $SO_3$.
$SO_3$ dissolved in 6 parts (wt.) of liquid $SO_2$.

TABLE II

*Effect of the alkylation temperature dodecene—benzene*

| Temp., ° C. | Percent Oil in Product (dry basis) | Wetting Times (seconds) in Distilled Water (on the total sodium sulfonate basis) | |
|---|---|---|---|
| | | 0.05% | 0.2% |
| −5 to 10 | 3.98 | 22.0 | 4.0 |
| 0 to 10 | 2.59 | 22.0 | 4.0 |
| 35 | 8.90 | 112.0 | 14.5 |

2 hour addition times for adding the dodecene into the Benzene-$H_2SO_4$.
95% $H_2SO_4$.
1 mole dodecene: 1 mole benzene: 2 moles $H_2SO_4$: 2 moles $SO_3$.
$SO_3$ dissolved in 6 parts (wt.) of liquid $SO_2$.

TABLE III

*Effect of varying the strength of $H_2SO_4$ on alkylation dodecene—benzene*

| $H_2SO_4$, Percent | Percent Oil in Product (dry basis) | Wetting Times (seconds) in Distilled Water (on the total sodium sulfonate basis) | |
|---|---|---|---|
| | | 0.05% | 0.2% |
| 91.0 | 8.27 | 59.0 | 12 |
| 92.8 | 8.16 | 65.0 | 18 |
| 95.0 | 2.59 | 22.0 | 4 |
| 96.0 | 3.45 | 23.0 | 4 |
| 98.0 | 4.87 | 26.0 | 4 |

2 hour addition times for adding the dodecene into the Benzene-$H_2SO_4$.
Alkylation temperature 0–10° C.
1 mole dodecene: 1 mole benzene: 2 moles $H_2SO_4$: 2 moles $SO_3$ (plus excess for water in diluted $H_2SO_4$).
$SO_3$ dissolved in 6 parts (wt.) of liquid $SO_2$.

It will be observed from the above tables that departure from any one of the three aforementioned ranges results in increase of residual oil content and reduction in wetting power of the sulfonated material. Moreover, it will be understood that in case of more than one such departure, the deleterious effects may be cumulative. On the other hand, when the prescribed conditions are maintained, all three tables show that the product is low in residual oil and high in wetting power.

Processes embodying the invention are further illustrated by the following specific examples. In comparing these examples with the above tables, it should be noted that the concentrations used for wetting time determinations are stated on the basis of the total ultimate material rather than on the basis of the concentration of sodium sulfonate.

*Example No. 1.*—Dodecene (186 g. commercial tetrapropylene) was added to commercial grade benzene (86.3 g.) and 95% sulfuric acid (229 g.) over a period of 2 hours and 13 minutes while stirring vigorously and keeping the temperature at 3–5° C. Upon completion of this addition the mixture was stirred an additional 25 minutes at 3–5° C. before sulfonating with a mixture of 174 g. liquid sulfur trioxide and 640 g. liquid sulfur dioxide. This sulfonation mixture was added in 8 minutes as the temperature of the reaction mixture ranged from −1° to 10° C. The temperature was then elevated in 15 minutes and maintained for 1 hour at 30° C. before pouring the acid mixture into 775 ml. water while keeping the temperature of the aqueous mixture under 55° C. The hydrolyzed acid was then neutralized to pH 8 with 585 g. of a 50% sodium hydroxide solution, again keeping the slurry under 55° C. with external cooling. This light cream colored slurry was drum dried to yield an almost white flake with the following properties:

Composition:

| | Percent |
|---|---|
| Sodium sulfonates | 52 |
| Sodium sulfate | 43 |
| Oil | 2.5 |
| Moisture | 2.5 |

Clarkson-Draves Wetting Tests (on a total product basis):

| | Seconds |
|---|---|
| 0.5% solution | 3 |
| 0.25% solution | 10.5 |
| 0.10% solution | 30 |

Color of a 10% solution—4 Gardner Scale.
Detergency Evaluation (using cotton patches soiled with a bone black, mineral oil, and carbon tetrachloride mixture).

These products were found to be 75–80% as effective as a high grade sodium dodecylbenzene sulfonate containing the equivalent amount of sodium sulfonate.

Foam Height (Ross-Miles Foam Test) (0.5% dried product):

| | Mm. |
|---|---|
| Initial height | 200 |
| Height after 5 min | 190 |

*Example No. 2.*—Nonene (63.1 g. commercial tripropylene) was added to commercial toluene (46 g.) and 95% sulfuric acid (102 g.) over a 2 hour and 15 minute period while keeping the temperature of the mixture at 4° C. with an ice bath. After stirring this alkylation mixture for an additional 20 minutes at 4° C., a mixture containing 84.17 g. liquid sulfur trioxide and 253 g. liquid sulfur dioxide was added in 4 minutes. The temperature during this sulfonation step ranged from −2° to 17° C. and was subsequently raised to 30° C. gradually over a period of 20 minutes. After maintaining this temperature for 1 hour with agitation, the acid was poured into 350 ml. of water while keeping the temperature of the aqueous mixture under 50° C. with external cooling. The hydrolyzed acid was then neutralized with 256 g. of a 50% sodium hydroxide solution to pH 8, again keeping the temperature under 50° C. with external cooling.

The neutral slurry was found to have the following properties:

Composition:

| | Percent |
|---|---|
| Total solids | 40.8 |
| Sodium sulfate | 19.5 |
| Oil | 0.9 |
| Sodium sulfonates | 20.4 |
| Water | 58.3 |

Clarkson-Draves Wetting Tests (on a total dry product basis):
  0.4% in aqueous solution_____ 13.5 seconds.
  0.4% in 2% NaOH solution__ Less than 1 second.

Color of a 10% solution—7 Gardner Scale.
*Example No. 3.*—Dodecene (84 g. commercial tetrapropylene) was added to commercial toluene (46 g.) and 95% sulfuric acid (102 g.) over a 2 hour and 6 minute period while keeping the temperature of the reaction mixture at 2°–8° C. After stirring the mass an additional 20 minutes at 2° C., 83.28 g. liquid sulfur trioxide dissolved in 253 g. liquid sulfur dioxide was added over a 5 min. period as the temperature ranged from 3–12° C. The temperature of the mixture was then raised to 30° C. in 11 minutes and maintained at 30° C. for one hour before pouring it into 350 ml. of water. The temperature was kept under 50° C. by external cooling during this hydrolysis step as well as during the subsequent neutralization with 254 g. of a 50% sodium hydroxide solution.

The neutral slurry was found to have the following properties:

Composition:

| | Percent |
|---|---|
| Total solids | 42.8 |
| Sodium sulfate | 18.4 |
| Oil | 1.4 |
| Sodium sulfonate | 23.0 |
| Water | 55.8 |

Clarkson-Draves Wetting Tests (on a total dry product basis):

| | Seconds |
|---|---|
| 0.4% in aqueous solution | 2.5 |
| 0.1% in aqueous solution | 26 |

Color of a 10% solution—7 Gardner Scale.

*Example No. 4.*—A sample of the hydrolyzed acid prepared in the identical manner given in Example No. 1 was neutralized with concentrated ammonium hydroxide to give a stable light yellow gelatinous liquid containing 35% solids which did not separate after standing at 20°–30° C. for over a year. This liquid product was found to possess the same surface active properties as the dried sodium salt described in Example No. 1.

The alkylaryl sulfonate product of the present invention is adapted for all applications where alkylaryl sulfonate type detergents are used, and are particularly useful where the odor and color of the product are not of critical importance. Surface active compounds of this type are in widespread use as household and laundry detergents, in salt water soaps, and as wetting, spreading, penetrating and emulsifying agents in the textile, paper, leather, adhesive, rubber, insecticide, and various other industries. Due to the presence of small amounts of olefin sulfonates and lower alkylaryl sulfonates, moreover, the product of the present invention has properties superior to those of purified alkylaryl sulfonates for some applications, e. g., their use in electrolytic media such as sodium hydroxide solutions.

It will be understood that the invention is not restricted to the details of the foregoing description or examples and that reference should be had to the appended claims for a definition of its merits.

What is claimed is:

1. A process for the production of surface active products which comprises adding an olefin selected from the group consisting of propylene trimer and tetramer over a period of one to three hours to a mixture of an aromatic compound selected from the group consisting of benzene and toluene with 95–96% sulfuric acid as an alkylation catalyst, maintaining the temperature of the mass between 0° C. and 10° C. during the alkylation, then adding a sulfonating agent to the mass comprising said olefin, aromatic compound, and sulfuric acid catalyst, and recovering the sulfonated material.

2. A process as defined in claim 1, wherein said sulfonating agent comprises sulfur trioxide dissolved in liquid sulfur dioxide.

3. A process as defined in claim 1, wherein said olefin comprises a member of the group consisting of propylene trimer and tetramer and mixtures thereof.

4. A process as defined in claim 1 wherein said mass is neutralized by a base comprising a member of the group consisting of the alkali metals and ammonium.

References Cited in the file of this patent

UNITED STATES PATENTS

| 2,072,153 | Bruson et al. | Mar. 2, 1937 |
| 2,290,167 | Datin | July 21, 1942 |
| 2,439,457 | Donleavy et al. | Apr. 13, 1948 |